United States Patent [19]
Williams et al.

[11] Patent Number: 5,172,981
[45] Date of Patent: Dec. 22, 1992

[54] HYDROSTATIC BEARING APPARATUS

[75] Inventors: Warren R. Williams, Fort Collins; Roger A. Hahn, Arvada; Bruce A. Moen, Golden, all of Colo.

[73] Assignee: Coors Brewing Company, Golden, Colo.

[21] Appl. No.: 703,913

[22] Filed: May 22, 1991

[51] Int. Cl.⁵ .............................................. F16C 32/06
[52] U.S. Cl. ...................................... 384/12; 384/108; 384/208
[58] Field of Search ................. 384/12, 108, 109, 206, 384/208

[56] References Cited

U.S. PATENT DOCUMENTS

| | | | |
|---|---|---|---|
| 3,127,955 | 4/1964 | Macks | 384/12 |
| 3,302,048 | 1/1967 | Gray | 384/108 |
| 3,392,995 | 7/1968 | Swerdfeger | 384/108 |
| 3,622,213 | 11/1971 | Onsrud | 384/108 |

OTHER PUBLICATIONS

J. P. O'Donoghue: Analysis of Spherical Multirecess Hydrostatic Journal Bearings C43/71 (1971).
D. E. Whitney: Static and Dynamic Behavior of Spherical Hydrostatic Bearings: Theory and Experiments ASME Publication Paper No. 72-Lub-35 (1972).

Primary Examiner—Lenard A. Footland
Attorney, Agent, or Firm—Klaas, Law, O'Meara & Malkin

[57] ABSTRACT

A spherical hydrostatic bearing having a ball mounted in a split socket for substantially friction free movement relative thereto and a linear hydrostatic bearing extending through the ball and having a longitudinal axis coinciding with the longitudinal axis of the ball for permitting substantially friction free sliding movement of a rod. Also, apparatus is provided for at least limiting rotational movement of the ball around the longitudinal axis of the split socket.

19 Claims, 2 Drawing Sheets

HYDROSTATIC BEARING APPARATUS

FIELD OF THE INVENTION

This invention relates generally to hydrostatic bearings for permitting substantially friction fee relative movement between two members and more particularly to a spherical hydrostatic bearing.

BACKGROUND OF THE INVENTION

In U.S. Pat. No. 4,956,990 issued to Warren R. Williams, which patent is incorporated herein by reference thereto, there is disclosed apparatus for forming can bodies. In this patent rotation of gears rotate mounting which are secured to each gear. A spherical bearing having a central bore extending therethrough is mounted in each of the mounting members and an end portion of a connecting means is mounted for sliding movement in the central bore. The other end portion is connected to a ram. As each gear is rotated, the spherical bearing moves in the mounting means and the end portion slides in the central bore to apply a force to reciprocate the ram. This operation places large forces on the spherical bearing so that it is extremely important that the movement between the spherical bearing and the mounting means and between the end portion and the central bore be substantially friction free while carrying very high loads. This invention provides hydrostatic bearing means for obtaining this substantially friction free movement.

BRIEF DESCRIPTION OF THE INVENTION

This invention provides a compensated spherical hydrostatic bearing for permitting substantially friction free movement of a ball mounted in a socket and wherein the ball has a linear hydrostatic bearing extending therethrough for permitting substantially friction free sliding movement of a rod therein. Also, the invention provides rotation limiting means for limiting the rotational movement of the ball relative to the longitudinal axis of the socket.

In a preferred embodiment of the invention, there is provided a spherical hydrostatic bearing comprising a socket having an inner surface shaped as a frustum of a sphere mounted at a fixed location. When used in apparatus as in the Williams patent, the socket is mounted at a fixed location on the rotating mounting member. A ball having an outer surface shaped as a frustum of a sphere is mounted in the socket so that the socket and the ball have coinciding longitudinal axes. Hydrostatic bearing means are provided for permitting substantially friction free movement of the ball in the socket. The socket comprises at least two mating socket portions each of which has an inner surface shaped as a frustum of a sphere. Connecting means are provided for connecting together the at least two mating socket portions. The hydrostatic bearing means comprises fluid inlet means in the socket for receiving fluid under pressure. A plurality of cavity forming means are provided for forming a plurality of spaced apart cavities between the inner surface of the socket and the outer surface of the ball. Conduit means are provided in the socket for conducting the fluid under pressure from the fluid inlet means to each of the cavities. Outlet means are located in the socket for permitting flow of fluid out of the socket. The plurality of cavities are formed in the inner surface of the socket and comprise a first set of circumferentially spaced apart cavities and at least a second set of circumferentially spaced apart cavities. The first set of circumferentially spaced apart cavities are located in the inner surface of one of the at least two mating socket portions, and the second set of circumferentially spaced apart cavities are located in the inner surface of the other of the at least two mating socket portions. The conduit means comprise an annular passageway located in the socket and in fluid communication with the fluid inlet means and a plurality of circumferentially spaced apart radial passageways, each of which is in fluid communication with the annular passageway and with one of the plurality of cavities. The hydrostatic bearing comprises a central bore extending therethrough with the central bore having an inner surface and a longitudinal axis coinciding with the longitudinal axis of the ball. A rod having an outer surface passes through the central bore. Hydrostatic bearing means ar provided for permitting substantially friction free sliding movement of the rod in the central bore. The hydrostatic bearing means comprise fluid inlet means in the ball for receiving fluid under pressure; a plurality of cavity forming means for forming a plurality of circumferentially spaced apart cavities between the inner and outer surfaces; conduit means in the ball for conducting the fluid under pressure from the fluid inlet means to each of the cavities; and outlet means in the ball for permitting flow of fluid out of the ball. The socket also has pressure fluid outlet means in fluid communication with the fluid under pressure. Conduit means extend between the pressure fluid outlet means and the fluid inlet means of the ball for permitting flow of the fluid under pressure from the socket to the ball. The cavity forming means comprise at least two axially spaced apart sleeves, each located between the inner and outer surfaces with each of the at least two axially spaced apart sleeves having a plurality of circumferentially spaced apart openings formed therein to cooperate with the inner surface of the central bore to effectively form the plurality of spaced apart cavities. Rotation limiting means are for limiting rotation movement of the ball about its longitudinal axis and preferably comprises at least two spaced apart posts projecting outwardly from the socket with each of the at least two spaced apart posts having a longitudinal axis parallel to the longitudinal axis of the socket and at least one post projecting radially outwardly from the ball and having at least a portion thereof located between at least portions of the at least two spaced apart posts.

BRIEF DESCRIPTION OF THE DRAWINGS

An illustrative and presently preferred embodiment of the invention is shown in the accompanying drawings in which.

DETAILED DESCRIPTION OF THE INVENTION

Figure 1:
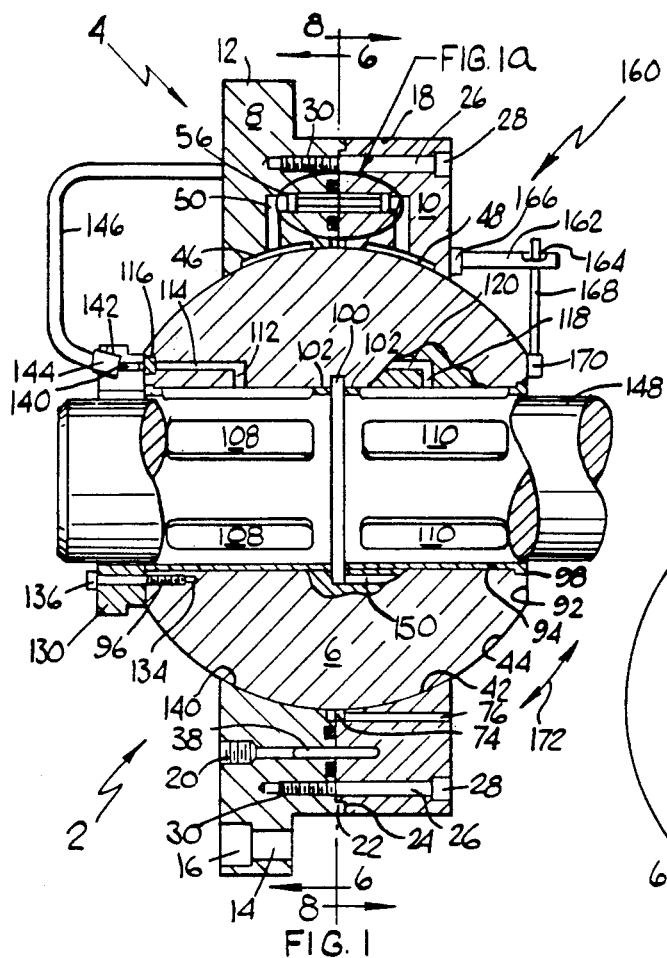
FIG. 1 is a view in cross section of the invention.
Figure 8:
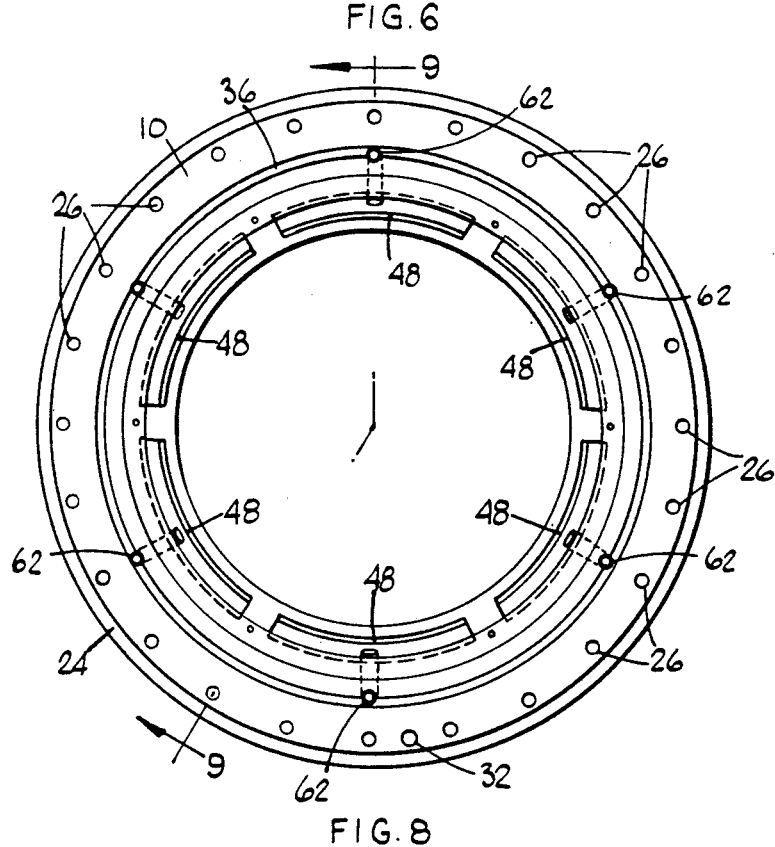
FIG. 8 is an elevational view taken on the line 8—8 of FIG. 1.

In FIG. 1, there is illustrated a spherical hydrostatic bearing 2 comprising a split socket 4 and a ball 6. The cross-sectional view in FIG. 1 would be a cross-sectional view taken on the line 9—9 of FIG. 8 if a ball 6 was illustrated in FIG. 8. The split socket 4 has a socket portion 8 and a socket portion 10. While the spherical hydrostatic bearing 2 has a variety of applications, it is particularly useful in the apparatus of the Williams patent described above which has relatively low velocity, relatively high load and substantially friction free requirements. The socket portion 8 has a flange portion 12 having a plurality of circumferentially spaced apart openings 14 having countersunk portions so that the spherical hydrostatic bearing 2 can be mounted in an opening (not shown) in the mounting member 48 or 56 of the Williams patent using headed threaded bolts (not shown) passing through the openings 14 and threaded into threaded openings (not shown) in the mounting member 48 or 56 so that the outer surface 18 of the socket portions 5, 8 and 10 is within the opening.

Figure 6:
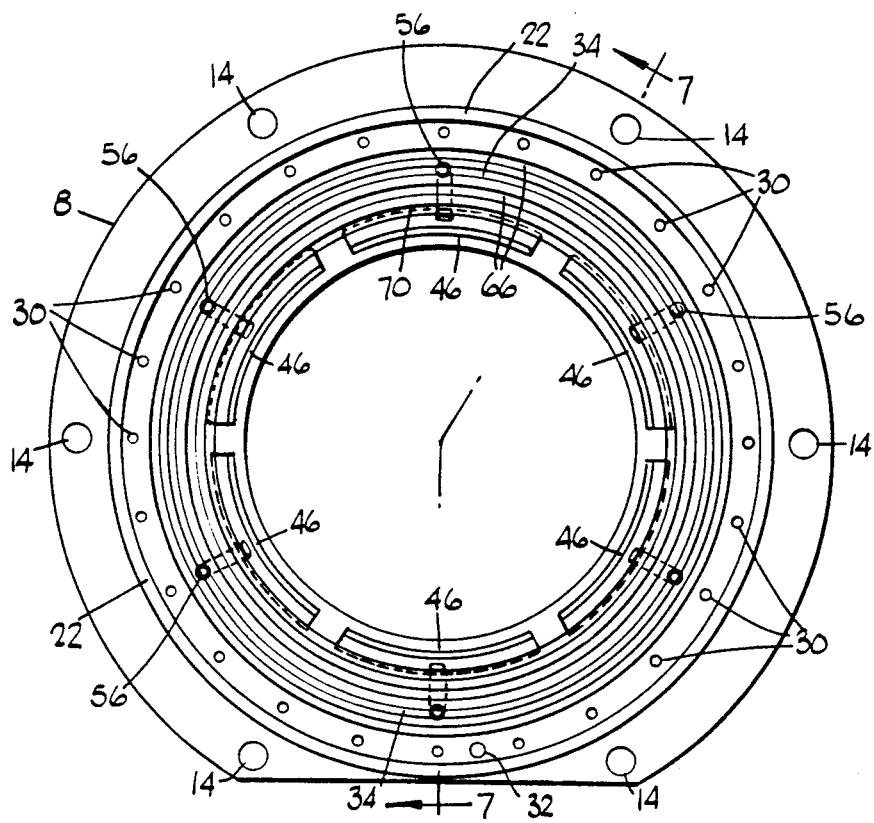
FIG. 6 is an elevational view taken on the line 6—6 of FIG. 1.

The socket portion 8 has a threaded inlet opening 20 (FIG. 1) for receiving a fitting (not shown) connected to a supply of fluid under pressure. If the socket 4 is stationary, then any conventional tubing may be used to supply the fluid under pressure to the threaded inlet opening 20. When the socket 4 is mounted on the rotating member 48 or 56 of the Williams patent, the fluid under pressure can be flowing through and out of the shaft 46 in the Williams patent to a connecting tube between the shaft 46 and the threaded inlet opening 20. The fluid preferably is an oil, such as 30 WT motor oil, or other similar materials and is supplied to the threaded inlet opening 20 at a pressure of between about 1000 and 1500 psi and preferably about 1200 psi. The socket portion 8 has an annular projection 22 and the socket portion 10 has an annular recess 24 so that, when assembled, the annular projection 22 fits into the annular recess 24. The flange portion 10 has a plurality of circumferentially spaced apart openings 26 having countersunk portions 28 and the flange portion 8 has a plurality of circumferentially spaced apart threaded openings 30 so that headed threaded bolts (not shown) may be used to secure the socket portions 8 and 10 together. The socket portions 8 and 10 have openings 32 (FIGS. 6 and 8) for receiving a portion of a dowel pin (not shown) for radial alignment of the socket portions 8 and 10. The socket portion 8 has an annular recess 34 and the socket portion 10 has an annular recess 36 so that when they are joined together, they form an annular passageway 38 (FIG. 1) for the flow of the fluid under pressure. The socket portion 8 has an inner surface 40 that is shaped corresponding to a frustum of a sphere and the socket portion 10 has an inner surface 42 that is shaped corresponding to a frustum of a sphere so that when secured together, they provide a partially spherical surface to mate with the spherical outer surface portion 44 of the ball 6.

Figure 9:
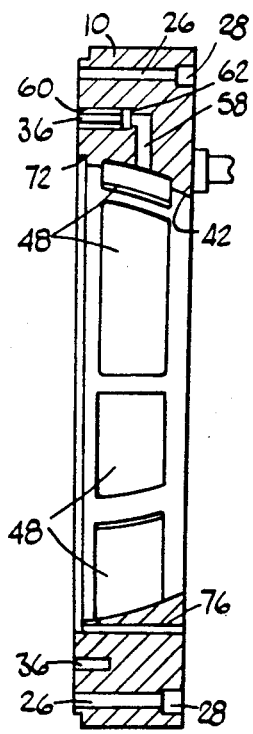
FIG. 9 is a cross-sectional view taken on the line 9—9 of FIG. 8.

A plurality of circumferentially spaced apart cavities 46 are formed in the inner surface 40 and a plurality of circumferentially spaced apart cavities 48 are formed in the inner surface 42. A plurality of circumferentially spaced apart L-shaped passageways are formed in the socket portion 8 and each has a radially extending portion 50 and a longitudinally extending portion 52 An annular shoulder portion 54 is formed in the longitudinally extending portion 52 so that a fluid flow control orifice 56 ma be inserted in the longitudinally extending portion 52 and moved against each annular shoulder portion 54 before the socket sections 8 and 10 are secured together. A plurality of circumferentially spaced apart L-shaped passageways are formed in the socket portion 10 and each has a radially extending portion 58 and a longitudinally extending portion 60. An annular shoulder portion 62 is formed in the longitudinally extending portion 60 so that a fluid flow control orifice 64 may be inserted in the longitudinally extending portion 60 and moved against the annular shoulder portion 62 before the socket portions are secured together. At least two concentric annular grooves 66 are formed in the socket portion 8 and an 0-ring gasket 68 is seated in each groove so as form fluid tight seals between the socket portions 8 and 10. The fluid flow control orifices 56 and 64 are exposed to the annular passageway 38 so that fluid under pressure therein will flow through the fluid flow control orifices 56 and 64 and through the radially extending portions 50 and 58 and into the cavities 46 and 48. An annular recess 70 is formed in the socket portion 8 and an annular recess 72 so that when the socket portions 8 and 10 are secured together, they form an annular passageway 74 (FIG. 1) for removing fluid. An opening 76 (FIG. 9) extending through the socket portion 10 is in fluid communication with the annular passage 74 to permit the escape of fluid from the annular passageway 74. A threaded outlet opening 78 is formed in the socket portion 8 and is in fluid communication with the annular recess 34.

The ball 6 is shaped as a frustum of a sphere and has the spherical outer surface portion 44 and generally planar end portions 90 and 92. A linear hydrostatic bearing extends through the spherical hydrostatic bearing 2 and comprises a central bore 94 extending through the ball 6 and having annular recesses 96 and 98 formed at each end thereof. An annular groove 100 is formed in the central bore 94. A pair of sleeves 102 are provided and a sleeve 102 is inserted into the central bore 94 from each end thereof. The sleeve 102 has an flange 104 that mates with the annular recesses 96 and 98 to position the sleeves 102 so that they terminate adjacent to the annular groove 100. Each sleeve 102 has a plurality of circumferentially spaced apart openings 106 which preferably are six in number. The openings 106 cooperate with the inner surface of the central bore 94 to effectively form a first set of cavities 108 and a second set of cavities 110.

A plurality of relatively short and long L-shaped passageways are formed in the ball 6. Each of the relatively short L-shaped passageways have a radially extending portion 112 and a longitudinally extending portion 114. Each radially extending portion 112 is in fluid communication with one of the cavities 108. The end of the longitudinally extending portion 114 is enlarged so that a fluid flow control orifice 116 similar to fluid flow control orifices 56 and 64 may be positioned therein to control the fluid passing into the longitudinal extending portion 114. Each of the relatively long L-shaped passageways has a radially extending portion 118 and a longitudinally extending portion 120 which also has an enlarged end portion to receive a fluid flow control orifice 116. Each of the radially extending portions 118 is in fluid communication with one of the cavities 110.

Figure 2:
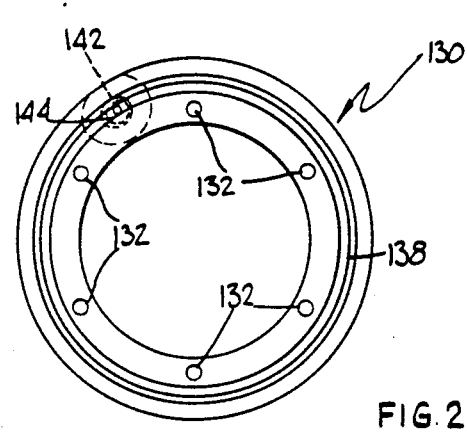
FIG. 2 is an elevational view of an annular member of this invention.
Figure 3:
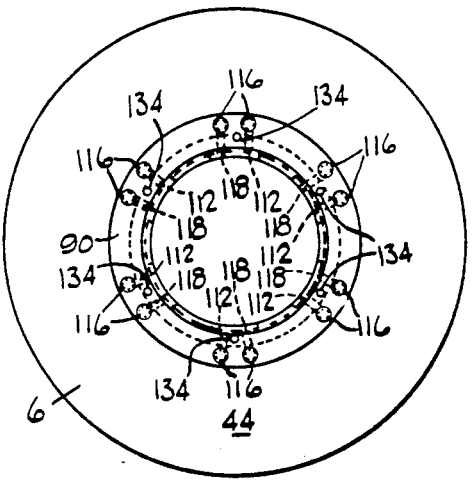
FIG. 3 is a side elevational view of a portion of FIG. 1 with parts removed taken from the left side of FIG. 1.
Figure 4:
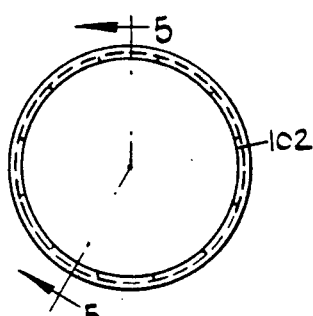
FIG. 4 is an end elevational view of a sleeve of this invention.
Figure 5:
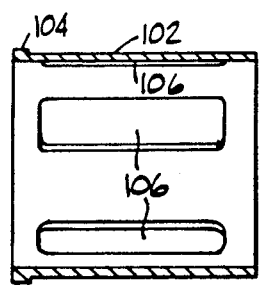
FIG. 5 is a cross-sectional view taken on the line 5—5 of FIG. 4.
Figure 1A:
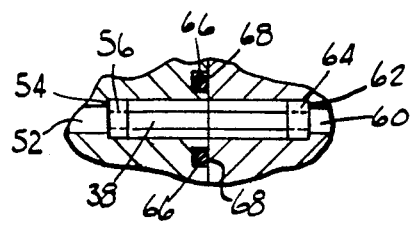
FIG. 1A is an enlargement of a portion of FIG. 1.
Figure 7:
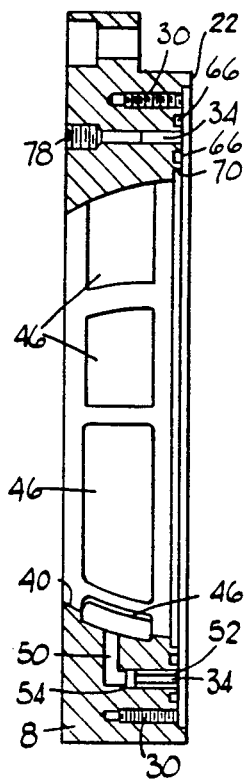
FIG. 7 is a cross-sectional view taken on the line 7—7 of FIG. 6.

An annular member 130 (FIGS. 1 and 2) is provided and has a longitudinal axis. The annular member 130 has a plurality of longitudinally extending openings 132 which are aligned with longitudinally extending threaded openings 134 in the planar end portion 90 so that headed threaded bolts 136 may be passed through the openings 132 and be threaded into the threaded openings 134 to secure the annular member 130 on the generally planar surface 90. The annular member 130 has an annular recess 138 which is in fluid communication with the fluid flow control orifices 116 when the annular member 130 is secured on the planar end surface 90. A longitudinally extending passageway 140 is formed in the annular member 130 and is in fluid communication with the annular recess 138. The longitudinally extending passageway 140 has an enlarged inlet portion 142 for receiving a fluid fitting 144. A flexible tube 146 extends between and is connected to the threaded outlet opening 78 (FIG. 7) and the inlet portion 142 so that fluid under pressure may flow from the annular passageway 38 in the socket 4 through the inlet portion 142, the passageway 140, the annular recess 138, the fluid flow control orifices 116 and through either the longitudinally extending portion 114 and radially extending portions 112 into cavities 108 or the longitudinally extending portions 120 and radially extending portions 118 into the cavities 110. A rod 148 reciprocates in the sleeves 102 so that the fluid in the cavities 108 and 110 form the hydrostatic bearing. Structures other than the flexible tube 146, such as a sliding trombone joint, can be used to conduct the fluid under pressure from the threaded outlet opening 78 to the inlet portion 142. An opening 150 is formed in the ball 6 and is in fluid communication with the annular groove 100 to permit the escape of fluid from the annular groove 100.

Rotation limiting means 160 are provided to prevent rotation of the ball 6 around its longitudinal axis. Two longitudinally extending rods 162 and 164 are mounted on a support plate 166 secured to socket portion 10. At least one radially extending rod 168 is mounted on a support plate 170 secured to the generally planar surface 92 of the ball 6. As illustrated in FIG. 1, a portion of the radially extending rod 168 passe between portions of the longitudinally extending rods 162 and 164 to limit any possible rotation of the ball 6 around its longitudinal axis so that the ball 6 rocks in the directions indicated by the arrow 172.

While a illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A hydrostatic bearing comprising:
    a socket having an inner surface shaped as a frustum of a sphere and having a longitudinal axis;
    a ball having an outer surface shaped as a frustum of a sphere and having a longitudinal axis coinciding with said longitudinal axis of said socket;
    mounting means for mounting said socket at a fixed location;
    said ball being mounted in said socket;
    hydrostatic bearing means for permitting substantially friction free movement of said ball in said socket; and
    a linear hydrostatic bearing extending through said ball and having a longitudinal axis coinciding with said longitudinal axis of said ball for permitting substantially friction-free sliding movement of a rod therein.

2. The invention as in claim 1 and further comprising:
    said socket and said ball having coinciding longitudinal axes; and
    rotation limiting means for limiting rotational movement of said ball about its longitudinal axis.

3. The invention as in claim 2 wherein said rotation limiting means comprise:
    at least two spaced apart posts projecting outwardly from said socket;
    each of said at least two spaced apart posts having a longitudinal axis parallel to said longitudinal axis of said socket; and
    at least one post projecting radially outwardly from said ball and having at least a portion thereof located between at least portions of said at least two spaced apart posts.

4. The invention as in claim 1 wherein said hydrostatic bearing means comprise:
    fluid inlet means in said socket for receiving fluid under pressure;
    a plurality of cavity forming means for forming a plurality of circumferentially spaced apart cavities between said inner and outer surfaces;
    conduit means in said socket for conducting said fluid under pressure from said fluid inlet means to each of said circumferentially spaced apart cavities, and
    outlet means in said socket for permitting flow of fluid out of said socket.

5. The invention as in claim 4 wherein said plurality of cavities forming means comprise:
    a plurality of cavities formed in said inner surface.

6. The invention as in claim 5 wherein said plurality of cavities comprises:
    a first set of circumferentially spaced apart cavities; and
    at least a second set of circumferentially spaced apart cavities.

7. The invention as in claim 6 wherein said socket comprises:
    at least two mating socket portions;
    each of said at least two mating socket portions having an inner surface shaped as a frustum of a sphere;
    connecting means for connecting together said at least two mating socket portions;
    said first set being located in said inner surface of one of said at least two mating socket portions; and
    said second set being located in said inner surface of the other of said at least two mating socket portions.

8. The invention as in claim 6 wherein said conduit means comprises:
    an annular passageway located in said socket and in fluid communication with said fluid inlet means;
    a plurality of circumferentially spaced apart radial passageways; and
    each of said radial passageways in fluid communication with said annular passageway and with one of said plurality of cavities.

9. The invention as in claim 1 wherein said socket comprises:

at least two mating socket portions;
each of said at least two mating socket portions having an inner surface shaped as a frustum of a sphere; and
connecting means for connecting together said at least two mating socket portions.

10. The invention as in claim 1 wherein said linear hydrostatic bearing comprises:
said ball having a central bore extending therethrough;
said central bore having a longitudinal axis coinciding with said longitudinal axis of said ball;
a rod ext ending through said central bore; and
linear hydrostatic bearing means for permitting substantially friction free sliding movement of said rod in said central bore.

11. The invention as in claim 10 wherein said linear hydrostatic bearing comprises:
fluid inlet means in said ball for receiving fluid under pressure;
said central bore having an inner surface;
said rod having an outer surface;
a plurality of cavity forming means for forming a plurality of circumferentially spaced apart cavities between said inner and outer surfaces;
conduit means in said ball for conducting said fluid under pressure from said fluid inlet means to each of said circumferentially spaced apart cavities; and
outlet means in said ball for permitting flow of fluid out of said ball.

12. The invention as in claim 11 wherein said cavity forming means comprise:
at least one sleeve located between said inner and outer surfaces; and
said sleeve having a plurality of circumferentially spaced apart openings formed therein to cooperate with said inner surface to effectively form said plurality of circumferentially spaced apart cavities.

13. The invention as in claim 12 and further comprising:
fluid inlet means in said socket for receiving fluid under pressure;
pressure fluid outlet means for permitting flow of said fluid under pressure from said socket;
said ball having a plurality of longitudinally extending passageways formed therein and in fluid communication with said plurality of circumferentially spaced apart openings;
said ball having a plurality of radially extending passageways formed therein, each of which is in fluid communication with one of said longitudinally extending passageways and one of said plurality of circumferentially spaced apart cavities;
an annular member having said fluid inlet means located therein;
said annular member having a longitudinal axis;
said annular member having an annular recess formed therein and in fluid communication with said plurality of longitudinally extending passageways;
said annular member having at least one longitudinally extending passageway formed therein and in fluid communication with said fluid inlet means and said annular recess; and
conduit means extending between said pressure fluid outlet means and said fluid inlet means for permitting flow of said fluid under pressure from said socket to said ball.

14. The invention as in claim 13 wherein said conduit means in said ball comprise:
at least one annular surface formed on said ball; and
mounting means for mounting said annular member on said annular surface so that each of said plurality of circumferentially spaced apart openings is in fluid communication with said annular recess.

15. The invention as in claim 11 wherein said cavity forming means comprise:
at least two axially spaced apart sleeves, each located between said inner and outer surfaces;
each of said at least two axially spaced apart sleeves having a plurality of circumferentially spaced apart openings formed therein to cooperate with said inner surface to effectively form said plurality of circumferentially spaced apart cavities.

16. The invention as in claim 11 wherein said hydrostatic bearing mean for permitting substantially friction free movement of said ball in said socket comprise:
fluid inlet means in said socket for receiving fluid under pressure;
a plurality of cavity forming means for forming a plurality of circumferentially spaced apart cavities between said inner and outer surfaces;
conduit means in said socket for conducting said fluid under pressure from said fluid inlet means to each of said circumferentially spaced apart cavities, and
outlet means in said socket for permitting flow of fluid out of said socket.

17. The invention as in claim 16 wherein said plurality comprises:
a first set of circumferentially spaced apart cavities; and
at least a second set of circumferentially spaced apart cavities axially spaced from said first set of circumferentially spaced apart cavities.

18. The invention as in claim 17 wherein said socket comprises:
at least two mating socket portions;
each of said at least two mating socket portions having an inner surface shaped as a frustum of a sphere;
connecting means for connecting together said at least two mating socket portions;
said first set of circumferentially spaced apart cavities being located in said inner surface of one of said at least two mating socket portions; and
said second set of circumferentially spaced apart cavities being located in said inner surface of the other of said at least two mating socket portions.

19. The invention as in claim 18 and further comprising:
said socket and said ball having coinciding longitudinal axes; and
rotation limiting means for limiting rotational movement of said ball about its longitudinal axis.

* * * * *